(12) United States Patent
Huang

(10) Patent No.: US 7,364,288 B2
(45) Date of Patent: Apr. 29, 2008

(54) LENS STRUCTURE OF SAFETY GLASSES

(76) Inventor: Jing-Yuan Huang, No. 158, Sec. 5, Fu-An Rd., Tainan City (TW)

( * ) Notice: Subject to any disclaimer, the term of this patent is extended or adjusted under 35 U.S.C. 154(b) by 0 days.

(21) Appl. No.: 11/498,892

(22) Filed: Aug. 4, 2006

(65) Prior Publication Data

US 2008/0030674 A1 Feb. 7, 2008

(51) Int. Cl.
*G02C 11/02* (2006.01)

(52) U.S. Cl. .......................... 351/51; 351/158

(58) Field of Classification Search ................ 351/51, 351/52, 158
See application file for complete search history.

(56) References Cited

U.S. PATENT DOCUMENTS 4,556,995 A * 12/1985 Yamamoto .................... 2/439
5,775,018 A * 7/1998 Steinborn .................... 40/651

* cited by examiner

*Primary Examiner*—Huy K Mai
(74) *Attorney, Agent, or Firm*—Rosenberg, Klein & Lee

(57) ABSTRACT

A lens structure of safety glasses consists of a lens part, and a warning sticker; the lens part consists of a main body, and a rim formed on a border of the main body; the rim has a strip-shaped recess on an upper portion, extending along an upper border thereof; the warning sticker is nontoxic, and contains no harmful substance, and it is stuck on the strip-shaped recess of the rim therefore the warning sticker won't stick out from the rim, and it is impossible for the warning sticker to be subjected to pulling force and fall off.

4 Claims, 5 Drawing Sheets

LENS STRUCTURE OF SAFETY GLASSES

BACKGROUND OF THE INVENTION

1. Field of the Invention

The present invention relates to an improvement on a lens structure of safety glasses, more particularly one, which has a light reflecting portion on an upper border thereof for producing warning effect.

2. Brief Description of the Prior Art

Different types of eyeglasses are available, which serve respective purposes. For instance, safety glasses are to be used to protect eyes from injuries by people who participate in sports and who are working, which injuries are usually caused by hitting of objects such as bats, balls, and liquid and small bits of melted metal at workplaces. According to a research, 90 percent of all sport and work-related eye injuries can be prevented if safety glasses are worn.

Common currently existing safety glasses consist of a hard lens part, a rim, a soft protecting part joined to a border of the rim, and an elastic, which is connected to two ends of the protecting part at two ends thereof; thus, the safety glasses can be firmly positioned around the wearer's head with the soft protecting part closely touching the face.

Referring to FIGS. 4 and 5, a currently existing hard lens part of safety eyeglasses consists of a lens part 3, and a reflecting layer 4, which is luminous or capable of reflecting light. The lens part 3 consists of a main body 32, and a rim 31, which are formed together in one manufacturing process. The reflecting layer 4 is a kind of reflecting paint, and formed on an upper portion of the rim 31, along an upper border. Or alternatively, the reflecting layer 4 can be printed on the upper portion of the rim 31. Therefore, the reflecting layer will produce warning effect.

However, the reflecting layer is prone to wear and erode owing to rubbing and perspiration, and in turn will fall off after it has been used for a long length of time. Consequently, the harmful substance in the reflecting layer will stick to people's skin, and cause harm to the health.

SUMMARY OF THE INVENTION

Therefore, it is a main object of the present invention to provide an improvement on a lens structure of safety glasses to overcome the above-mentioned problems.

The lens structure of the present invention consists of a lens part, and a warning sticker. The lens part consists of a main body, and a rim formed on a border of the main body, which rim has a strip-shaped recess on an upper portion, extending along an upper border thereof. The warning sticker is nontoxic, and contains no harmful substance, and it is stuck on the strip-shaped recess of the rim therefore the warning sticker won't cause damage to health or stick out from the rim. Consequently, it is impossible for the warning sticker to be subjected to pulling force and fall off.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
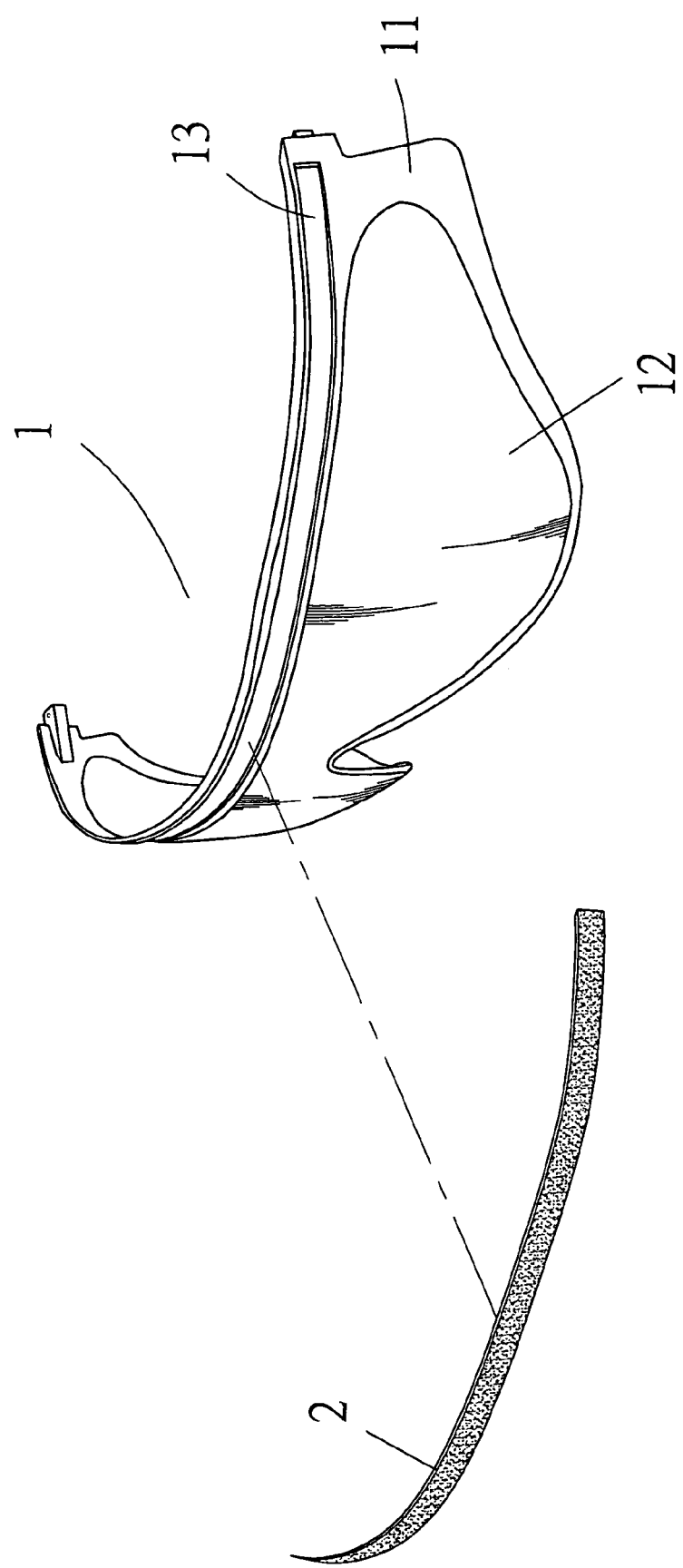
FIG. 1 is an exploded perspective view of the present invention.

Referring to FIG. 1, a first preferred embodiment of a lens structure of safety glasses consists of a lens part 1, and a warning sticker 2. The lens part 1 is made of transparent materials, and consists of a rim 11, and a main body 12, which are formed together in one manufacturing process. The rim 11 is formed on the border of the main body 12 for increasing the strength of the lens part 1. The rim 11 has a strip-shaped recess 13 on an upper portion, extending along an upper border of the rim 11.

Figure 2:
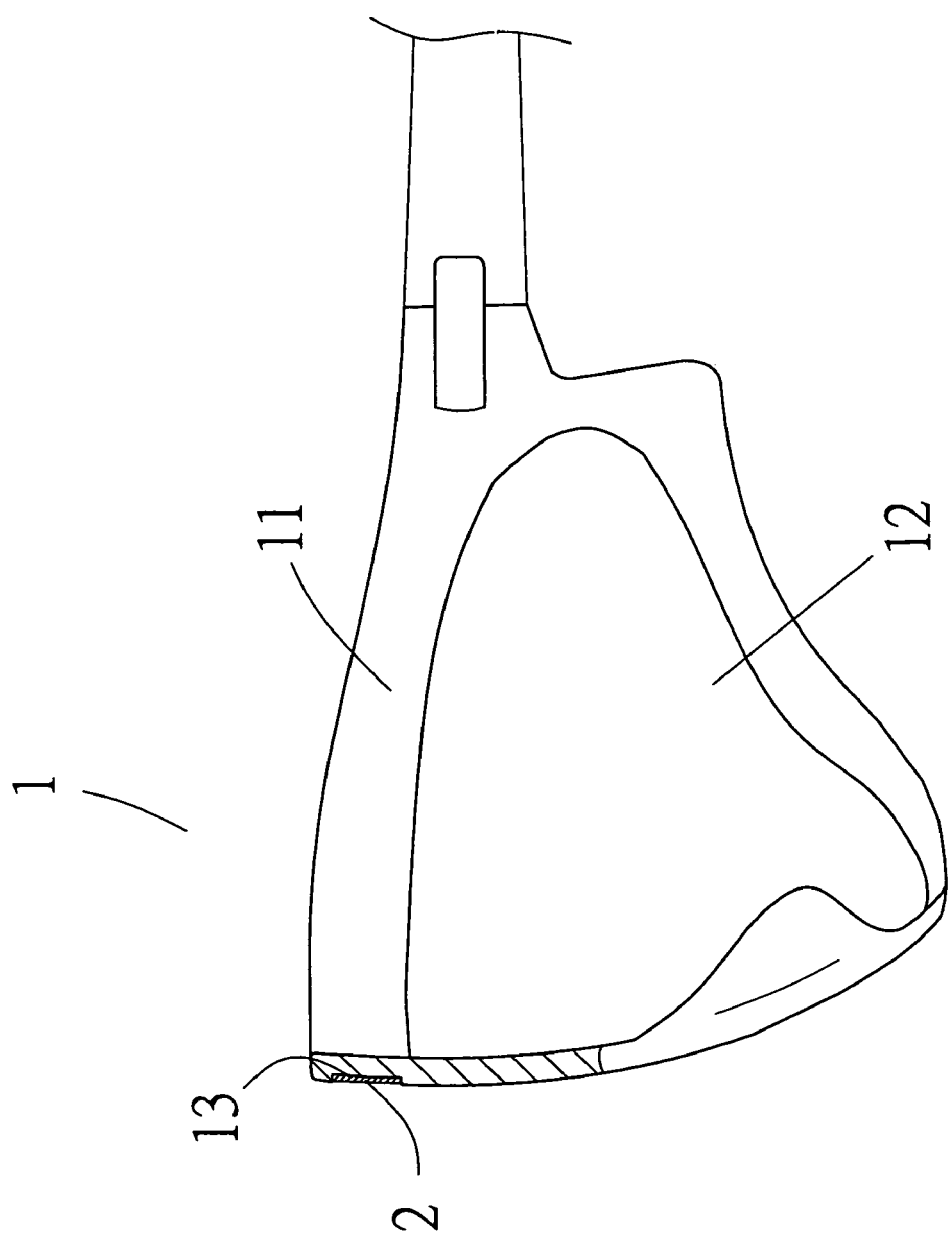
FIG. 2 is a lateral sectional view of the present invention.

The warning sticker 2 is nontoxic, and contains no harmful substance therefore it won't cause damage to health even if people and it are touching for a long length of time. Furthermore, the warning sticker 2 can reflect light, and is luminous. Referring to FIG. 2, the warning sticker 2 is stuck on the strip-shaped recess 13 of the rim 11 so that it won't stick out from the rim 11, and the lens part 1 will produce a warning effect. Because the warning sticker 2 doesn't stick out from the rim 11, it's not possible for the warning sticker 2 to be subjected to pulling force and fall off.

Figure 3:
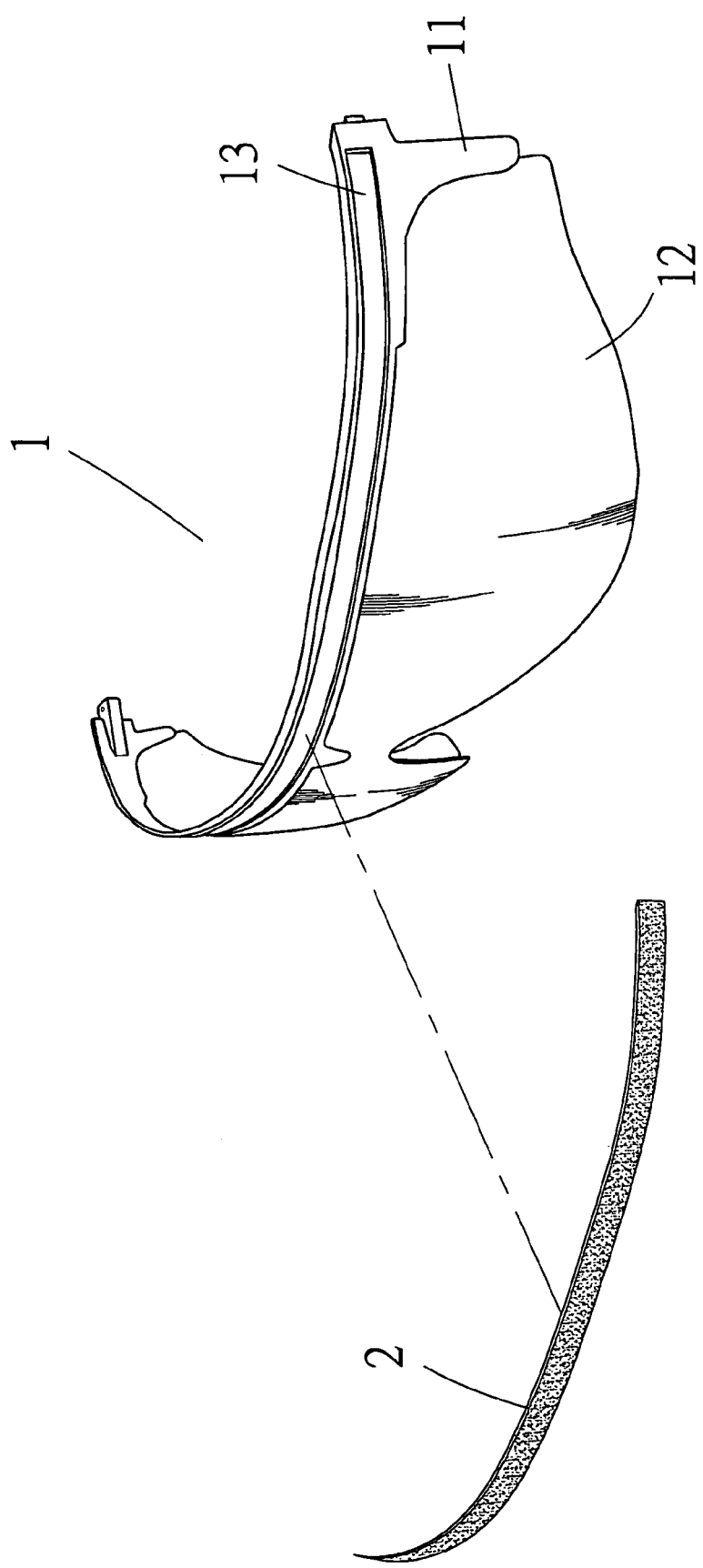
FIG. 3 is an exploded perspective view of the second preferred embodiment in the present invention.
Figure 4:
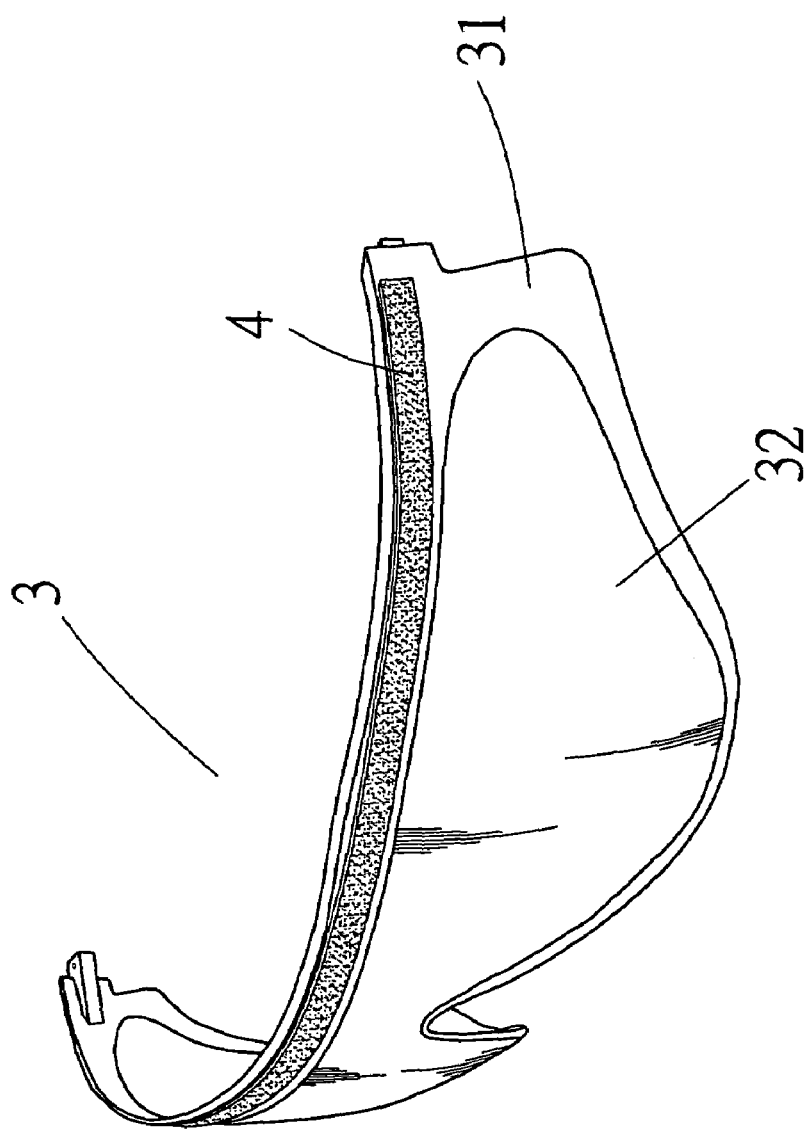
FIG. 4 is a perspective view of the currently existing lens structure of safety glasses.
Figure 5:
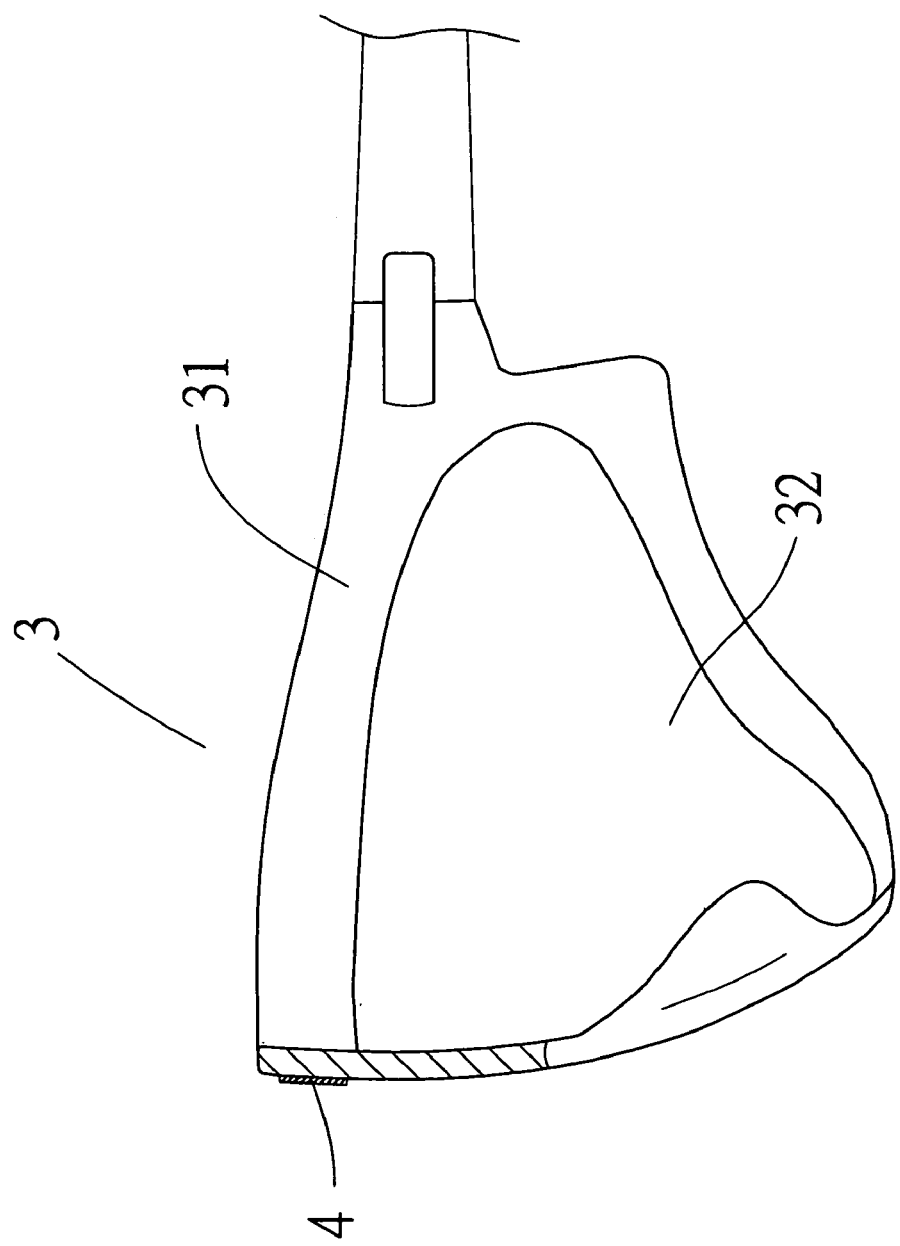
FIG. 5 is a lateral sectional view of the currently existing structure.

Referring to FIG. 3, a second preferred embodiment of a lens structure of safety glasses is provided, which is a semi-rimmed one. The lens structure consists of a lens part 1, and a warning sticker 2. The lens part 1 consists of a semi-shaped rim 11, and a main body 12. The rim 11 has a strip-shaped recess 13 on an upper portion, extending along an upper border of the rim 11. The warning sticker 2 is stuck on the strip-shaped recess 13 of the rim 11 for producing warning effects. Therefore, consumers are provided with another choice, which is relatively attractive.

From the above description, it can be seen that the present invention has the following advantages:

1. The warning sticker of the present invention is nontoxic, and contains no harmful substance therefore it won't cause damage to the health even if people and it are touching for a long length of time.

2. The warning sticker is stuck on the strip-shaped recess on the upper portion of the rim therefore it won't stick out from the rim, and it's not possible for the warning sticker to be subjected to pulling force and fall off.

What is claimed is:

1. A lens structure of safety glasses, comprising
a lens part, the lens part having a main body and a rim, said main body and said rim being integrally formed in one piece formation, and said rim having a strip-shaped recess formed therein, said strip-shaped recess being formed within an upper portion of said rim and extends along an upper border thereof, said strip-shaped recess being bound by surfaces which are co-planar with said rim; and
a warning sticker, said warning sticker being adhered to said rim within the strip-shaped recess.

2. The lens structure of safety glasses as recited in claim 1, wherein said rim is a semi-shaped one.

3. The lens structure of safety glasses as recited in claim 1, wherein said warning sticker has a light reflecting function.

4. The lens structure of safety glasses as recited in claim 1, wherein said warning sticker is luminous.

* * * * *